United States Patent [19]
Shirochi

[11] Patent Number: 5,991,083
[45] Date of Patent: Nov. 23, 1999

[54] IMAGE DISPLAY APPARATUS

[75] Inventor: Yoshiki Shirochi, Chiba, Japan

[73] Assignee: Sony Corporation, Tokyo, Japan

[21] Appl. No.: 09/059,252

[22] Filed: Apr. 14, 1998

[30] Foreign Application Priority Data

Apr. 14, 1997 [JP] Japan .................................. 9-096064

[51] Int. Cl.⁶ ............................. G02B 27/10; G02F 1/295

[52] U.S. Cl. ............................................. 359/618; 385/10

[58] Field of Search ............................. 359/618; 385/10; 349/62; 356/446

[56] References Cited

U.S. PATENT DOCUMENTS

5,751,383   5/1998   Yamanaka .................................. 349/13

*Primary Examiner*—Hung Xuan Dang
*Assistant Examiner*—Michael A Lucas
*Attorney, Agent, or Firm*—Hill & Simpson

[57] ABSTRACT

An image display apparatus capable of displaying a clear image without a prominent vacancy between pixels, even when a luminance distribution is present within each of the pixels, has a display device for displaying a plurality of pixels, each having a luminance distribution and an optical element for diffusing each of the pixels displayed by the display device so that each of the pixels has a plurality of peaks in the luminance distribution.

14 Claims, 9 Drawing Sheets

IMAGE DISPLAY APPARATUS

BACKGROUND OF THE INVENTION

1. Field of the Invention

The present invention relates to an image display apparatus for displaying an image by displaying a plurality of pixels, each having a luminance distribution.

2. Description of the Prior Art

As an image display apparatus, there is provided an image display apparatus in which a light from a light source is applied to a liquid crystal panel having pixel openings corresponding to a plurality of pixels and a light transmittance is controlled for each of the pixel openings. In this type of image display apparatus, there is a target to increase luminance of each pixel so as to display a clear and bright image, Furthermore, in order to display a color image in this type of image display apparatus, normally, color filters corresponding to the three primary colors are arranged corresponding to each of the pixels However, the color filters bring about a problem to decrease the luminance. Therefore, the image display apparatus capable of displaying a color image has a great problem to increase the pixel luminance.

Figure 1:
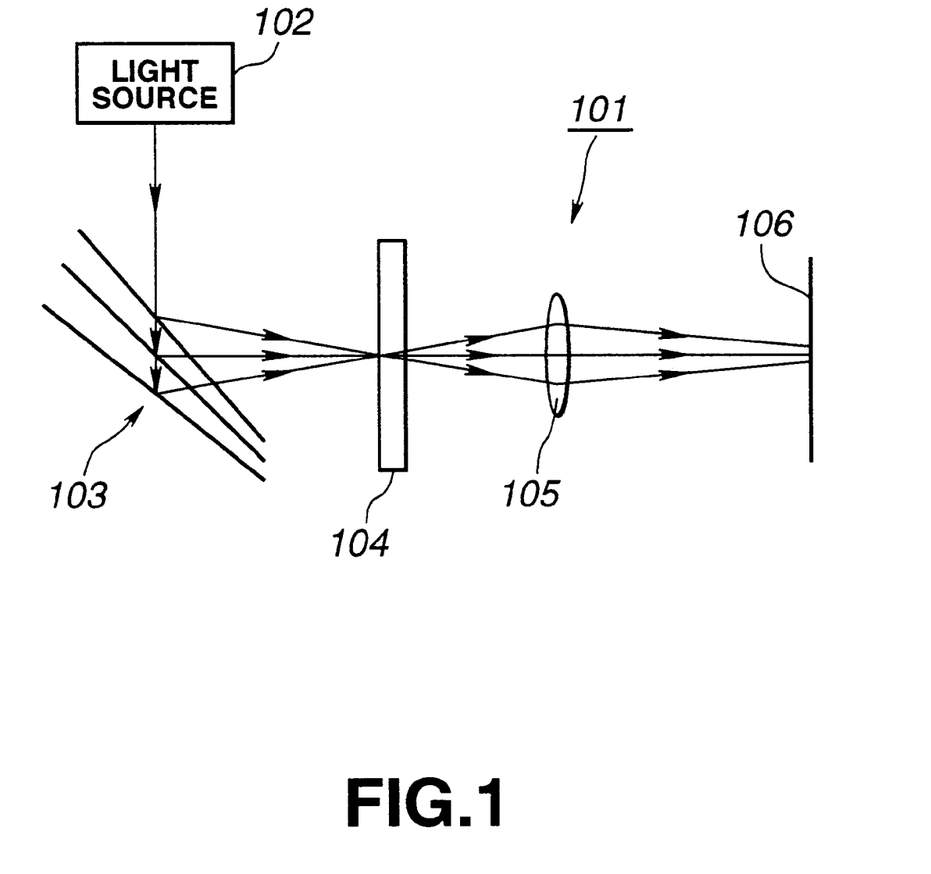
FIG. 1 shows a configuration example of a conventional image display apparatus.

To cope with this, as an image display apparatus capable of obtaining a high luminance in color image display, there has been proposed an image display apparatus 101 as shown in FIG. 1. This image display apparatus 101 includes: a light source 102 which emits a white light; a dichroic mirror 103 which reflects the light from the light source 102, into three primary colors; a display device 104 having pixel openings corresponding to pixels; a projection lens 105 for projecting an image; and a screen 106 for displaying an image projected by the projection lens 105.

In this image display apparatus, the light from the light source 102 is separated by the dichroic mirror 103 into three primary colors of red, green, and blue colors, which are introduced into the display device 104 as different incident angles, respectively. The display device 104 has a liquid crystal panel having pixel openings corresponding to the pixels constituting an image, and a micro array lens consisting of a plurality of lenses, each corresponding to three pixel openings on the liquid crystal panel. The red, green, and blue lights from the dichroic mirror 3 is respectively focused by the micro array lens in different pixel openings. That is, in this image display apparatus 101, utilizing the difference in the incident angle of the red, green, and blue lights into the display device 104, the red, green, and blue lights are respectively focused by the micro array lens in the different pixel openings. Thus, without using color filters, it is possible to obtain pixels for displaying the red color, pixels for displaying the green color, and pixels for displaying the blue color. Moreover, the liquid crystal panel controls the light transmitting state for each of the pixel openings so as to obtain a desired image. Thus, it is possible to obtain a color image consisting of the red, green, and blue pixels. The image obtained is projected by the projection lens 105 onto the screen 106. In this image display apparatus 101, the light itself is introduced as red, green, and blue lights to the pixels and accordingly no color filters causing luminance lowering are required. Consequently, it is possible to obtain a color image with a high luminance.

However, in the aforementioned image display apparatus, the light introduced to each of the pixel opening is focused by the lens and it is impossible to obtain a uniform distribution of luminance within a pixel. Moreover, the size of the pixel itself displayed is normally defined as smaller than the pixel opening formed on the liquid crystal panel.

Figure 2:
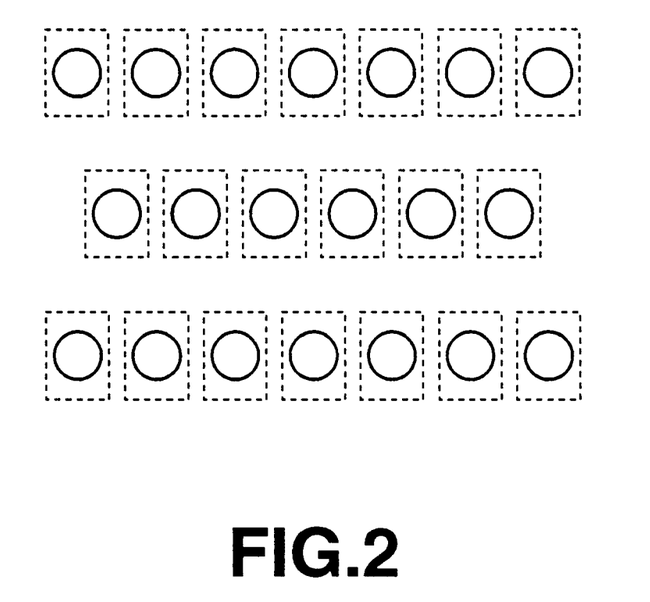
FIG. 2 shows a relationship between pixels openings formed on a liquid crystal panel and actually displayed pixels in the image display apparatus of FIG. 1.

FIG. 2 shows such a pixel display state in the image display apparatus. It should be noted that in FIG. 2, the pixel opening is indicated by a dotted line and a pixel actually displayed is indicated by a solid line. As shown in FIG. 2, the actually displayed pixel is a circular spot smaller than the rectangular pixel opening. For this, when a large screen image is to be obtained, a vacancy between pixels called black stripe becomes noticeable. Such a black stripe forms a meshwork pattern on the displayed image. It is preferable to make the black stripe less noticeable. Moreover, in this image display apparatus, as each pixel is displayed as a circular sport smaller than the pixel opening, the image displayed is deteriorated by the prominent black dots of the meshwork.

Figure 3:
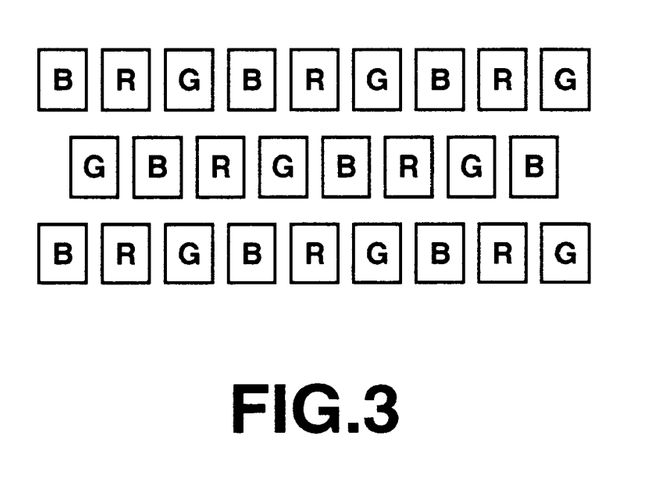
FIG. 3 shows an example of pattern of the pixel openings arranged on a liquid crystal panel.

Furthermore, in the image display apparatus capable of displaying a color image, a set of pixels corresponding to the three primary colors is arranged with a predetermined repetition cycle. If an interval between pixels is large, the repetition of pixels of an identical color becomes prominent and the image displayed is greatly deteriorated. Moreover, as shown in FIG. 3, in a case when the red pixel openings R, blue pixel openings B, and green pixel openings G are arranged in the so-called checker pattern, the interval between identical color pixels is increased in the diagonal directions, causing unevenness in the image displayed.

In order to solve these problems in the image display apparatus, it is required to reduce the pixel interval and increase the number of pixels. However, it is not easy to realize this, considering the production yield and production costs.

By the way, in a pickup apparatus such as a CCD camera, it is possible that an image signal picked-up can be subjected to an electrical processing so as to make the vacancy between pixels less noticeable. That is, in a pickup apparatus such as a CCD camera, it is easy to apply an electric processing by way of low-pass filtering to the image signal pickup-up, so as to make the interval between pixels less noticeable. Thus, in the pickup apparatus, the image signal picked-up is subjected to an electric processing, so as to suppress deterioration of the image caused by the interval between pixels and the like.

On the other hand, in the image display apparatus, in order to make the vacancy between pixels less noticeable, it is necessary to fill the vacancy after the light is emitted from the display device. Consequently, it is difficult to carry out an electric processing so as to make less noticeable the meshwork pattern formed by the vacancy between the pixels and the repetition cycle of identical color pixels. That is, in the image display apparatus, it is necessary to employ an optical processing instead of electrical processing, for making less noticeable the vacancy between the pixels.

As an optical processing in the image display apparatus for making less noticeable the vacancy between the pixels, there can be exemplified a method for blurring the lens focus for the viewers. However, in this method, the image to be displayed itself is blurred and it is not preferable to apply such a method. Moreover, in the aforementioned image display apparatus in which the red, blue, and green light are introduced to the display device at different angles so as to eliminate use of the color filters, if the lens focus is blurred, the red, blue, and green pixel positions are displaced, causing mismatching between the three primary colors. Consequently, in this image display apparatus, it is impossible to employ the method of lens focus blurring for making less noticeable the vacancy between the pixels. Moreover, there is also a so-called non-glare method which uses an obscured glass or the like so as to diffuse the pixels, but this method makes the screen obscure and it not so preferable.

SUMMARY OF THE INVENTION

It is therefore an object of the present invention to provide an image display apparatus having a luminance distribution within each pixel but capable of displaying a clear image without a noticeable vacancy between pixels.

The image display apparatus according to the present invention includes a display device for displaying a plurality of pixels each having a luminance distribution; and an optical element for diffusing each of the pixels displayed by the display device. Here, the optical element diffuses the pixels, so as to obtain such a luminance distribution that each pixel has a plurality of peaks.

In this image display apparatus, the display device displays a plurality of pixels each having a luminance distribution. These pixels are diffused so that the luminance distribution in each pixel has a plurality of peaks. As a result, even if there is a vacancy between pixels at the stage when the pixels are displayed by the display device, the vacancy is filled by the light diffused by the optical element, thus enabling to make less noticeable the vacancy between the pixels.

BRIEF DESCRIPTION OF THE DRAWINGS

FIG. 8 shows a diffusion by a diffuser.

FIG. 10 shows a diffusion by a diffuser.

FIG. 11 shows a simulation result of a wire frame image.

DETAILED DESCRIPTION OF PREFERRED EMBODIMENTS

Hereinafter, description will be directed to embodiments of the present invention with reference to the attached drawings.

Figure 4:
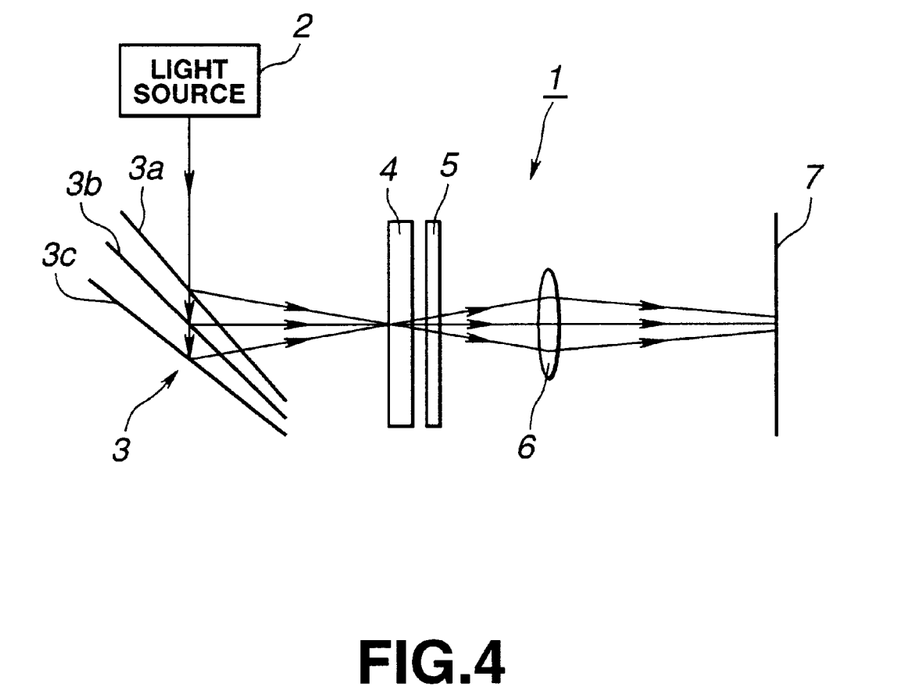
FIG. 4 shows a configuration example of an image display apparatus according to an embodiment of the present invention.

FIG. 4 shows a configuration example of an image display apparatus according to the present invention. This image display apparatus 1 includes a light source 2 for emitting a white light; a dichroic mirror 3 for separating the light from the light source 2 into the three primary colors when reflecting them; a display device 4 for displaying pixels constituting an image; a diffuser 5 which is an optical element for diffusing the pixels displayed by the display device 4; a projection lens 6 for projecting the image; and a screen 7 on which the image projected by he projection lens 6 is displayed.

In this image display apparatus 1, the white light from the light source 2 is introduced to the dichroic mirror 3. The dichroic mirror 3 consists of a first mirror 3a, a second mirror 3b, and a third mirror 3c which are arranged on the optical axis of the white light from the light source 2 in such a manner that the light is introduced to the respective mirrors 3a, 3b, and 3c at different incident angles. Here, the first mirror 3a reflects a light of the blue color wavelength and transmits light of the other wavelengths. The second mirror 3b reflects light of green color wavelength and transmits light of the other wavelengths. The third mirror 3c reflects light of the red color wavelength. Consequently, the white light from the light source 2 is separated by this dichroic mirror 3 into the three primary colors of red, green, and blue and reflected at different angles.

The light reflected by the dichroic mirror 3 is introduced to the display device 4. Here, the incident angle of the light of the blue wavelength reflected by the first mirror 3a, the incident angle of the light of the green wavelength reflected from by the second mirror 3b, and the incident angle of the light of the red wavelength reflected from the third mirror 3c are all different. That is, the incident angle into the display device 4 differs depending on the red, green, and blue color light.

Figure 5:
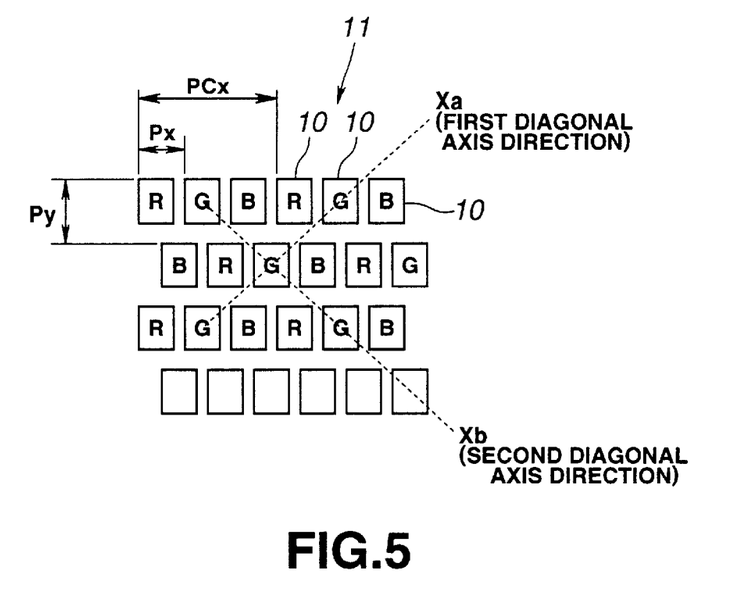
FIG. 5 shows an example of pattern of pixel openings formed on a liquid crystal panel.

The display device 4 supplied with these lights for displaying pixels constituting an image, as shown in FIG. 5, has a liquid crystal panel 11 having a plurality of pixel openings 10 arranged in the vertical and horizontal directions.

This liquid crystal panel 11 is capable of controlling the light quantity transmitting each of the pixel openings 10. The pixel openings 10 are divided into red color openings R for displaying red pixels, blue color openings B for displaying blue pixels, and green color openings G for displaying green pixels. these red openings R, the blue openings B, and the green openings G are cyclically repeated.

More specifically, if it is assumed that the horizontal pitch of the pixel openings 10 is Px and the vertical pitch of the pixel openings 10 is Py, the position of the pixel openings 10 in each adjacent row is displaced in the horizontal direction by ½ Px. Moreover, in each line of pixel openings 10, a set of red opening R, green opening G, and blue opening B is repeated in the arrangement. Consequently, a pitch PCx of pixel openings 10 of identical colors in the horizontal direction is three times greater than the pitch Px. Moreover, these pixel openings 10 are arranged in such a way that the pixel openings 10 of every other lines are in straight vertical columns and the positions of the pixel openings 10 of identical colors are displaced in the horizontal direction by ½ PCx.

Thus, in the liquid crystal panel 11, the pixel openings 10 are arranged in checkers pattern. Note that in the explanation given below, diagonal directions of arrangement of pixel openings 10 of identical colors will be referred to as a first diagonal direction Xa (connecting the bottom left and the upper right) and a second diagonal direction Xb (connecting the upper left and the bottom right).

Figure 6:
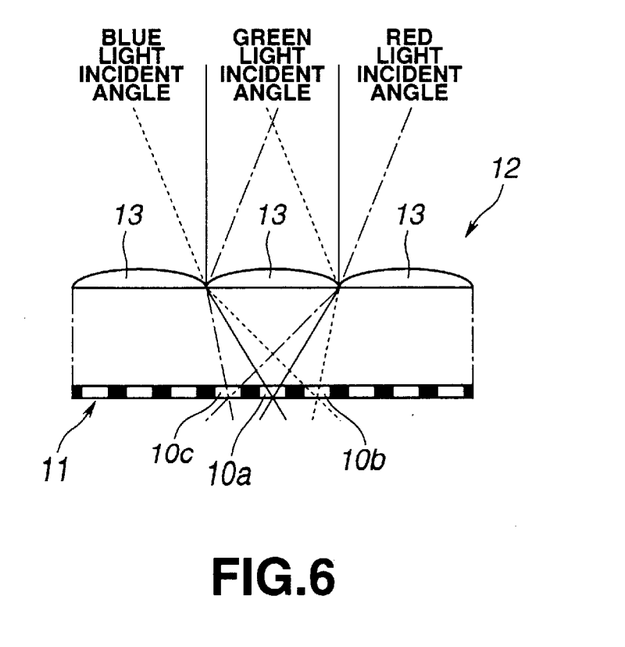
FIG. 6 is a cross sectional view showing a display device having a micro array lens and a liquid crystal panel in which the three primary colors are focused in different pixel openings.
Figure 7:
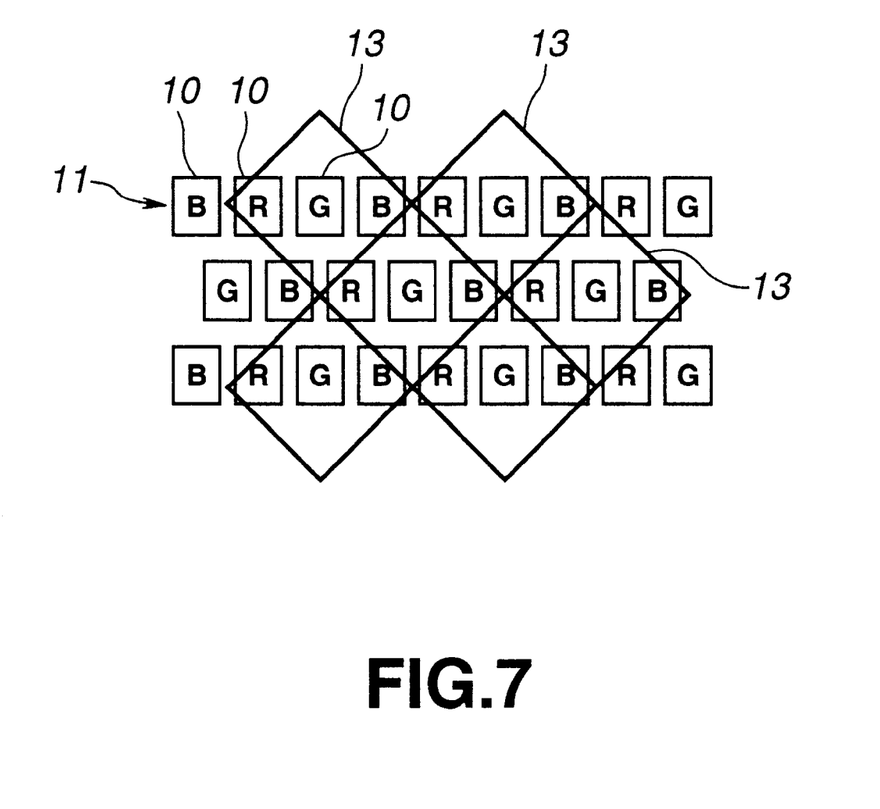
FIG. 7 is a plan view showing the positional relationship between the pixel opening pattern formed on the liquid crystal panel and the lenses of the micro array lens in the display device of FIG. 6.

Moreover, as shown in FIG. 6 and FIG. 7, the display device 4 has a micro array lens 12 arranged at a preceding stage of the liquid crystal panel 11, so that a predetermined wavelength of light is introduced through this micro array lens 12 to each of the pixel openings 10 formed on the liquid crystal panel 11.

That is, the blue openings B are supplied with blue light reflected by the first mirror 3a of the dichroic mirror 2 and focused by the micro array lens 12; the green openings G are supplied with green light reflected by the second mirror 3b of the dichroic mirror 2 and focused by the micro array lens 12; and the red openings R are supplied with red color reflected by the third mirror 3c of the dichroic mirror 2 and focused by the micro array lens 12. The light transmitting the red openings R displays the red pixels, the light transmitting the blue openings B displays the blue pixels, and the light transmitting the green openings G displays the green pixels.

The micro array lens 12 is an optical element consisting of a plenty of fine lenses 13. It should be noted that in FIG. 7, an area corresponding to one lens 13 is surrounded by a solid line.

This micro array lens 12 utilizes the difference in the incident angle from the dichroic mirror 2 depending on the colors, so as to focus the light from the dichroic mirror 2 onto different pixel openings 10. That is, each lens 13 of the micro array lens 12 focuses the respective color lights in such a manner that, as shown in FIG. 5 for example, a green light is introduced to a pixel opening 10a facing the center of the lens 13, a blue light is introduced to a pixel opening 10b which is at right to the pixel opening 10a, and a red light is introduced to a pixel opening 10c which is at left to the pixel opening 10a. Thus, red, blue, or green light is introduced to each of the pixel openings.

That is, in this image display apparatus 1, by using the difference in the incident angle of the red, green, blue lights into the display device, the red, green, and blue lights are respectively focused by the micro array lens 12 in the different pixel openings 10. Thus, without using color filters, it is possible to obtain pixels for displaying the red color, pixels for displaying the green color, and pixels for displaying the blue color. This display device 4, according to an image signal inputted from outside, is capable of controlling light transmittance for each of the pixel openings. Thus, the respective pixels constituting an image are displayed so as to obtain a desired color image.

Figure 8A:
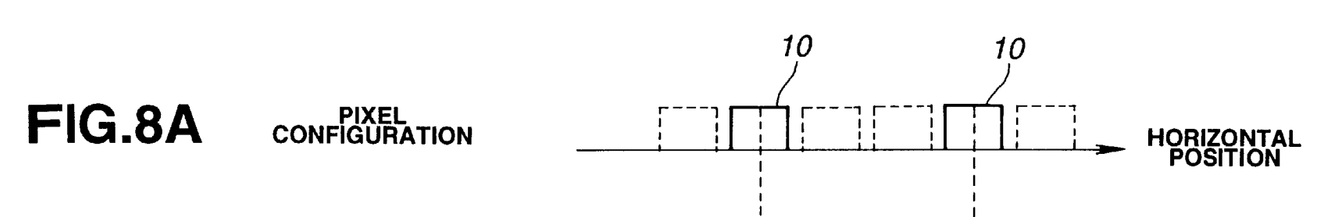
FIG. 8A schematically shows the configuration of the pixel openings.
Figure 8B:
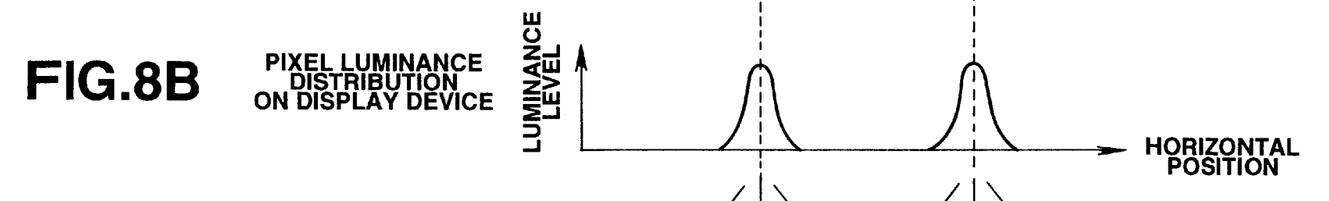
FIG. 8B shows a pixel luminance distribution on the display device.
Figure 8C:
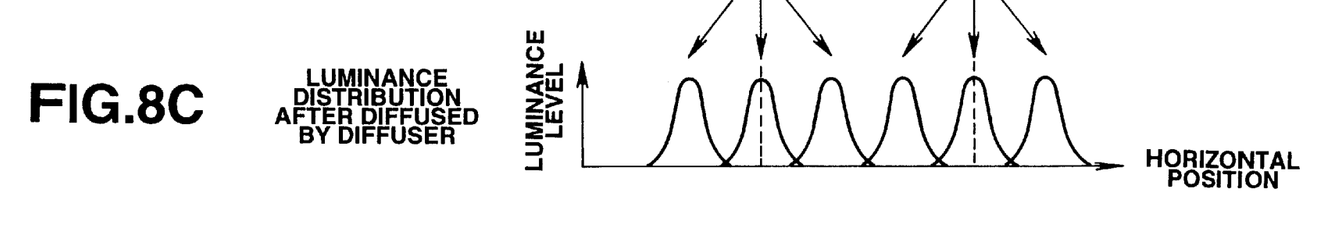
FIG. 8C shows a pixel luminance distribution after diffused by the diffuser.

By the way, in this display device 4, the light coming into each of the pixel openings 10 of the liquid crystal panel 11 is focused by the micro array lens 12. Consequently, although each of the pixel openings 10 is rectangular as shown in FIG. 8A, the light transmitting through the pixel openings 10 is formed into an almost circular spot having a luminance distribution, as shown in FIG. 8B, with a peak almost at the center of the pixel opening 10. It should be noted that in FIG. 8A, the pixel opening 10 of the identical color is indicated by a solid line and the other pixel openings 10 are indicated by a dotted line. FIG. 8B and FIG. 8C which will be detailed later show a luminance distribution corresponding to the pixel openings 10 indicated by the solid line in FIG. 8A.

As shown in FIG. 8B, in this image display apparatus 1, a luminance distribution is generated within each of the pixels displayed by the display device 4. Moreover, the configuration of the pixel opening 10 is different from the configuration of the pixel actually displayed by the display device 4.

In a conventional image display apparatus, with such a luminance distribution as it is, the pixels are displayed. For this, the vacancy between the pixels are noticeable as meshwork patterns. Moreover, as the pixels are displayed in a discrete manner, the image displayed is deteriorated by the dots caused by the pixel patterns. Thus, this type of conventional image display apparatus has a problem that a luminance distribution is generated within each of the pixels, causing meshwork patterns formed by the vacancy between the pixels and the dotted feeling by the pixel patterns. Note that this problem will not cause much trouble in an image display apparatus using color filters because the luminance distributions within pixels are almost identical. That is, this problem causes a great trouble especially in the image display apparatus in which a luminance distribution is generated within each of the pixels.

To cope with this problem, the image display apparatus 1 according to the present invention 1 employs the diffuser 5 for diffusing the pixels displayed by the display device 4. This diffuser 5 is a transmitting type diffraction grating for diffusing a light in two different directions in such a manner that each pixel has a plurality of peaks as shown in FIG. 8C.

This diffuser 5 is a 9-point diffuser for diffusing an incident light into an X shape generating 0 dimensional light, +1 dimensional light, and −1 dimensional light in parallel to the first diagonal axis direction Xa and 0 dimensional light, +1 dimensional light, and −1 dimensional light in parallel to the second diagonal axis direction Xb. Note that diffusion of ±2 dimensions and after should not be generated or if generated any, they should be in the order which can be ignored.

Figure 9:
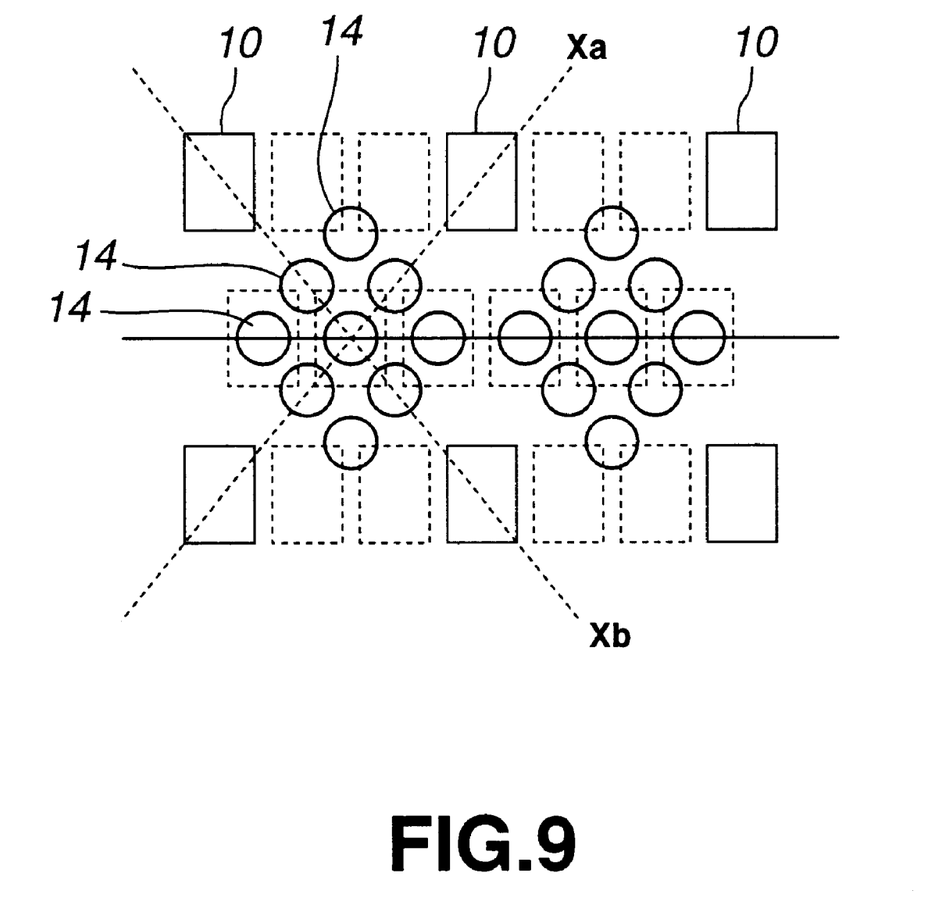
FIG. 9 shows a light spot diffused by the diffuser.

As shown in FIG. 9, the light transmitting through the diffuser 5 becomes a pattern having 9 light spots 14 for a single pixel opening 10. It should be noted that in FIG. 9, in order to show the diffusion clearly, only the pixel openings 10 of an identical color are indicated by a solid line and the other pixel openings 10 are indicated by a dotted line. Moreover, the diffusion pattern obtained by the diffuser 5 is shown only for the light transmitting through the two pixel openings 10.

This diffuser 5, as shown in FIG. 9, diffuses the light from the pixel openings 10 so that the vacancy between the pixels of the identical color is filled with the ±1 dimensional light. This reduces the luminance unevenness, making less noticeable the vacancy between pixels. In this diffuser which diffuses the incident light into an X shape, special effects can be obtained for reducing the luminance unevenness in the diagonal directions.

Here, the diffuser 5 is preferably such that light is diffused into 0 dimensional light, +1 dimensional light, and −0 dimensional light, each having an almost identical peak as shown in FIG. 8C. Thus, the nine optical spots 14 enable to produce a unanimous image without having particular spots outstanding than others.

It should be noted that as the diffuser 5 here, a 9-point diffusion type is used in which diffusion of ±2 dimensions and after can be ignored. It is also possible to use a higher dimensional diffuser generating ±2 or ±3 dimensional light. However, when using a higher dimensional diffusion, it is preferable that the diffusion range be such that diffusion of a pixel will not be overlapped with diffusion of an adjacent pixel of an identical color. Moreover, when generating a higher dimensional diffusion, it is preferable that the diffused light of the respective dimensions have an identical peak.

Moreover, the diffuser 5 is preferably diffuses each of the pixels in such a manner that as shown in FIG. 10, for each of the pixels, a luminance distribution after diffusion has a plurality of peaks on the screen 7 where the viewer observes a image displayed by the display device 4, and the total of the half width of the plurality of peaks is identical to the distance between the adjacent pixels of an identical color. That is, when designing such an image display apparatus 1, it is preferable to determine the diffusion direction and diffusion dimension by the diffuser 5 according to the image formed on the screen instead of the pixels themselves displayed by the display device 4. In the image display apparatus 1 thus designed, the vacancy between the pixels of identical colors is filled at a position where an image is actually formed, thus significantly reducing the luminance unevenness so that the vacancy between the pixels almost cannot be observed.

Figures 10A, 10B, 10C:
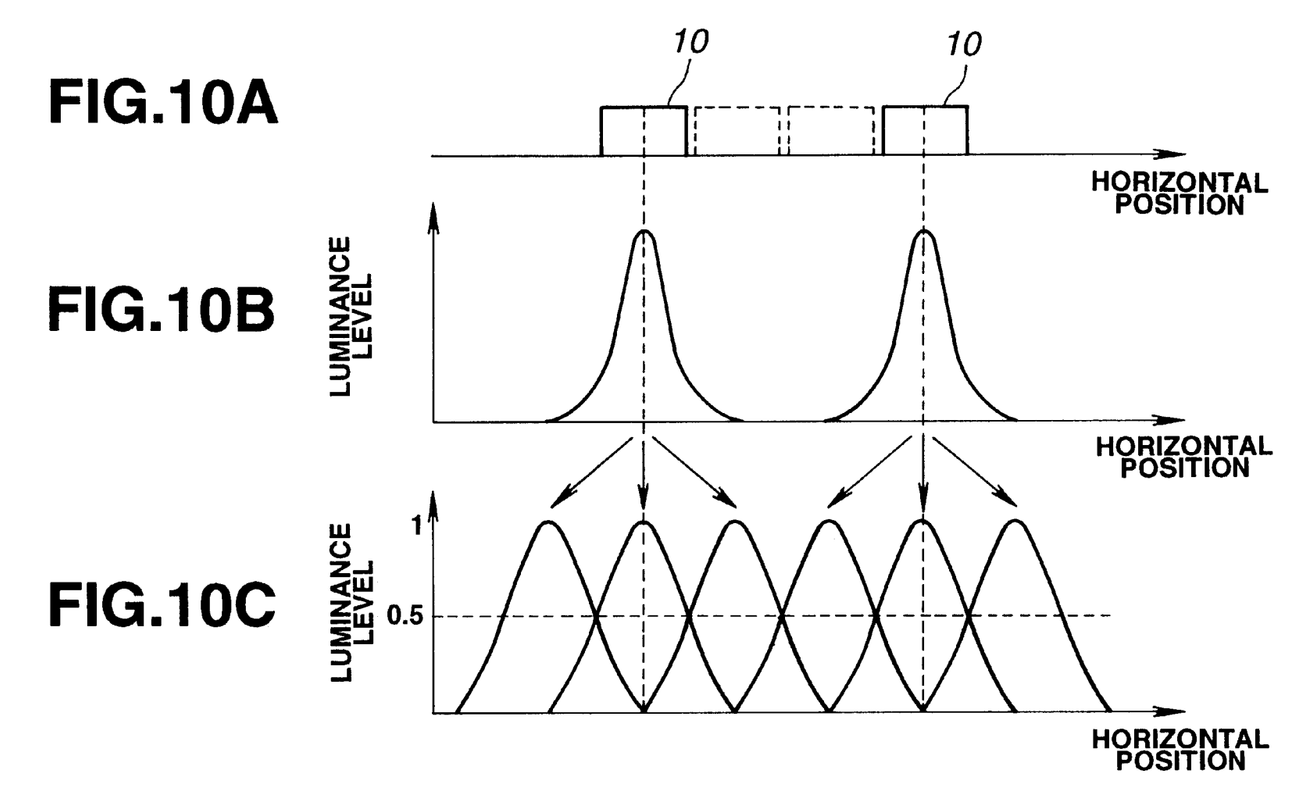
FIG. 10A schematically shows the configuration of the pixel openings.
FIG. 10B shows a pixel luminance distribution on the display device.
FIG. 10C shows a pixel luminance distribution after diffused by the diffuser.

It should be noted that in FIG. 10, a diffusion state is shown similarly in FIG. 8. That is, in FIG. 10A, pixel openings of an identical color are indicated by a solid line and the other pixel openings 10 are indicated by a dotted line. FIG. 10B shows a luminance distribution of the pixel openings 10 indicated by the solid line in FIG. 10 prior to diffusion by the diffuser 5. FIG. 10C shows a luminance distribution of the pixel openings 10 indicated by the solid line in FIG. 10A after diffusion by the diffuser 5.

The lights which have been diffused by the diffuser 5 for each of the pixels are introduced to the projection lens 6 as shown in FIG. 4. The projection lens 6 project these lights to form an image on the screen 7. That is, in this image display apparatus 1, the image displayed by the display device 4 is diffused by the diffuser 5 for each of the pixels constituting the image before being projected by the projection lens 6 onto the screen 7. Note that this image display apparatus 1 is a so-called rear projector type image display apparatus in which the image displayed by the light transmitting the screen 7 is observed by a viewer.

It should be noted that this screen 7 may be either a simple flat screen or a periodic screen such as an particular screen. When such a periodic screen is used, unless the present invention is employed, moire fringes may be generated in the image displayed because of the relationship between the periodicity of the screen 7 and the arrangement periodicity the pixels displayed by the display device 4. However, in the image display apparatus according to the present invention, the diffuser 5 increases the apparent number of pixels and accordingly, there is almost no possibility of generation of moire fringes.

In the image display apparatus 1 having the aforementioned configuration, the pixels displayed by the display device 4 are diffused by the diffuser 5, which makes less noticeable the meshwork formed by the vacancy between the pixels and the dotted feeling caused by the pixel patterns. That is, in he aforementioned image display apparatus 1, an optical processing enables to make less noticeable the meshwork pattern and the dotted feeling without deteriorating the resolution of the displayed image.

Moreover, in contrast to the conventional method which makes less noticeable the vacancy between pixels by blurring the lens focus for the viewer, which results in an unclear image or mismatching between colors, the image display apparatus 1 enables to make less noticeable the vacancy between the pixels while retaining a clear image without causing blurring of the pixels or mismatching between colors.

It should be noted that in the aforementioned image display apparatus 1, the diffuser 5 diffuses pixels in the first diagonal axis direction Xa and the second diagonal axis direction Xb, but the diffusion direction by the diffuser 5 is not to be limited to these directions. That is, the effects of the present invention can be obtained if the pixels from the display device 4 are diffused so as to fill the vacancy between the pixels of identical colors, not depending on the diffusion direction. Consequently, for example, it is possible that pixels are diffused in two directions which orthogonally intersect each other and each of the direction is arranged at ±45 degrees with respect to the vertical and the horizontal arrangement directions of the pixel openings 10. In this case, it is possible to reduce Moire interference between the diffraction grating pitches formed in the diffuser 5. Moreover, each of the pixel diffusion directions may be, for example, in parallel to the rows and columns of the pixels.

However, the diffusion by the diffuser 5 is preferably such that the vacancy between the pixels of identical color is effectively filled. Consequently, if the pixel openings 10 are arranged as shown in FIG. 5, as has been described above, the diffusion directions are preferably in the first diagonal axis direction Xa and the second diagonal axis direction Xb.

Moreover, in the aforementioned image display apparatus 1, the diffuser 5 is provided between the display device 4 and the projection lens 6, but the diffuser 5 may be provided after the projection lens 6, for example, between the projection lens 6 and the screen 7.

Moreover, in the aforementioned image display apparatus 1, the dichroic mirror 3 having three mirrors 3a, 3b, and 3c is used for separating the light from the light source 2 into the three primary colors and changing their incident angles, but it is also possible, for example, to use a diffraction grating instead of the dichroic mirror 3. Alternatively, it is possible to use a light source itself which emits the three primary colors. What is necessary for the image display apparatus 1 is a configuration that lights of different colors are introduced to the display device 4 at different incident angles.

Moreover, in the aforementioned image display apparatus 1, the liquid crystal panel 11 is used to control the light quantity transmitting through each of the pixel openings, but it is also possible to use a device other than a liquid crystal panel if it capable of controlling the light quantity for each of the pixel openings.

Moreover, in the aforementioned display apparatus 1, the image displayed by the display device 4 appears on the screen 7 as a component to be observed by a viewer, but the image display apparatus according to the present invention may no have such a screen 7. That is, for example, the present invention can also be applied to an image display apparatus such as a projector for projecting an image on a screen arranged apart from the image display apparatus. Alternatively, the present invention can be applied to an image display apparatus such as a so-called head mount display in which pixels displayed by a display device are focused on the retina of the viewer.

Lastly, for reference, FIG. 11 shows a simulation result of a wire frame image obtained when the vacancy between pixels of an identical color is made less noticeable by diffusing the pixels displayed by a display device. Note that in this simulation, it is assumed that an entire area of the pixel opening is lit. Consequently, there is a slight difference from a case having a luminance distribution within a pixel. However, even in the case having a luminance distribution within a pixel, the light distribution state tends to be similar.

Figure 11A:
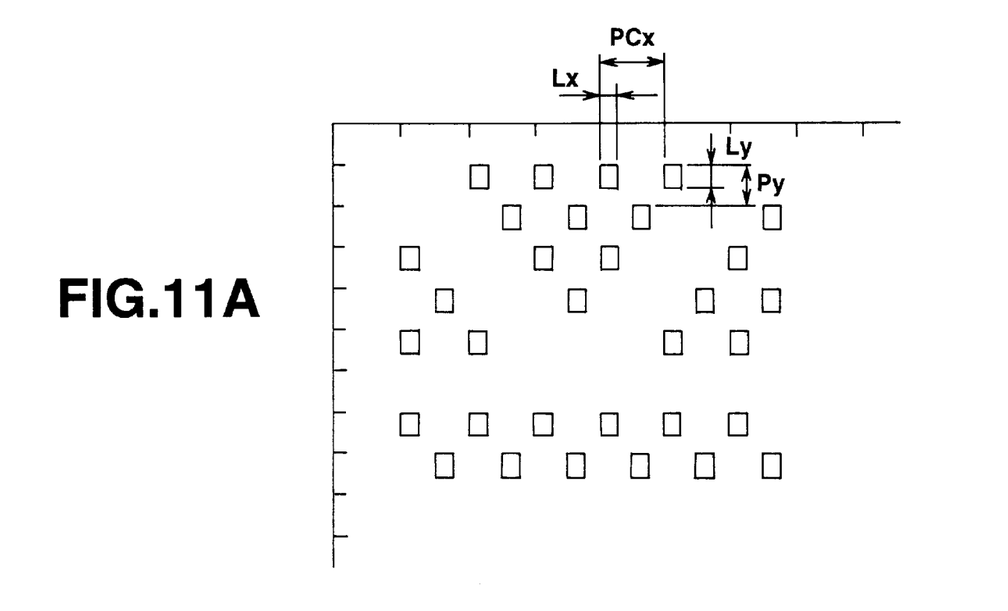
FIG. 11A shows a wire frame image prior to diffusion by the diffuser.
Figure 11B:
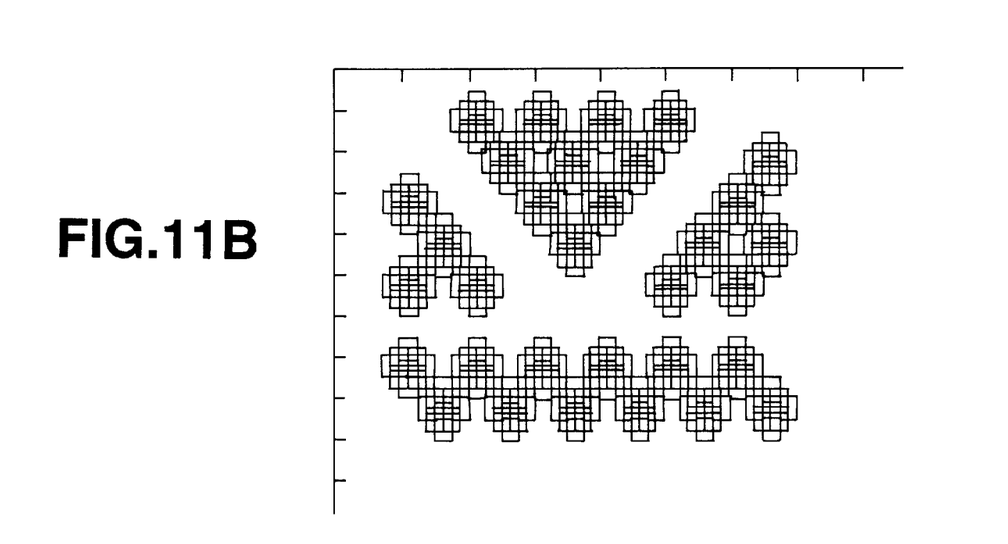
FIG. 11B shows the wire frame image after diffused by the diffuser.

Here, FIG. 11A shows an example of an original pixel pattern on the display device prior to diffusion by a diffuser; and FIG. 11B shows a pixel pattern obtained by diffusing the original pixel pattern by using the diffuser. It should be noted that the pattern shown in FIG. 8B shows a V-shaped portion not lit, so as to clearly show the diffused light at the edge portions in the diagonal directins.

Here, each of the pixel openings has a horizontal width Lx which is 15.5 μm, and a vertical width Ly which is 21.4 μm. Moreover, the horizontal pixel pitch is 19.8 μm. Consequently, a horizontal pitch PCx of pixel openings of an identical color is 19.8 μm×3=59.4 μm. Moreover, the vertical pixel pitch Py is 37.0 μm. Moreover, the diffusion of each pixel is carried out as a 9-point diffusion with two diffusion directions which orthogonally intersect each other and each of which directions forms ±45 degrees with respect to the vertical and horizontal arrangement directions of the pixel openings. The intervals between the 0 dimension peak position and the ±1 dimension peak positions are respectively 11.7 μm. As can be seen from FIG. 11B, when the pixels are diffused by the diffuser, the vacancy between the adjacent pixels of an identical color is filled by the diffused light and the vacancy is almost not noticeable. Moreover, the orthogonal edge portions are also smoothly displayed. It should be noted that the wire frame image shown in FIG. 11 assumes that the entire pixel opening is lit and looks slightly different from a case having a luminance distribution within a pixel. However, even when a luminance distribution is present in a pixel, the light distribution state tends to be similar and this kind of simulation is useful when designing the basic configuration of a diffuser.

As is clear from the aforementioned, in the image display apparatus according to the present invention, each of the pixels displayed by the display device is diffused, so that even each pixel has a luminance distribution, the vacancy between the pixels can be made almost not noticeable, enabling to display a clear image. That is, the image display apparatus according to the present invention enables to make less noticeable the vacancy between the pixels and the cycle of pixels of identical colors, thus enabling to display even fine portions of an image clearly. Consequently, according to the present invention, it is possible to improve the image quality without increasing the number of pixels. In other words, the image display apparatus according to the present invention enables to obtain an excellent image quality with a small number of pixels, i.e., an image quality of a level obtained by a conventional image display apparatus having a plenty of pixels.

I claim:

1. An image display apparatus comprising:
   a display device for displaying a plurality of pixels, each having a luminance distribution; and
   an optical element for diffusing each of the pixels displayed by said display device in at least two directions so that each of said pixels has a plurality of peaks in the luminance distribution.

2. An image display apparatus as claimed in claim 1, wherein
   said display device has a plurality of openings corresponding to said pixels and displays each of said pixels by light transmitting through said openings; and
   each of said openings has a shape which is different from a shape of each of said pixels displayed by said display device.

3. An image display apparatus as claimed in claim 2, wherein a light source is further provided for emitting a light of a predetermined wavelength for each of said plurality of openings.

4. An image display apparatus as claimed in claim 3, wherein a micro array lens is further provided for focusing the light from said light source for each of said openings, so that light of a predetermined wavelength is introduced to a corresponding opening.

5. An image display apparatus as claimed in claim 1, wherein said optical element diffuses each of said pixels in a direction of diagonal arrangement of pixels of an identical color.

6. An image display apparatus as claimed in claim 1, wherein said optical element diffuses each of said pixels in two directions which diagonally intersect each other.

7. An image display apparatus comprising:
   a display device for displaying a plurality of pixels, each having a luminance distribution; and
   an optical element for diffusing each of the pixels displayed by said display device with the light being diffused by the optical element having a 0 dimension peak which is almost identical to +1 dimensional peaks.

8. An image display apparatus as claimed in claim 7, wherein
   said display device has a plurality of openings corresponding to said pixels and displays each of said pixels by light transmitting through said openings; and
   each of said openings has a shape which is different from a shape of each of said pixels displayed by said display device.

9. An image display apparatus as claimed in claim 8, wherein a light source is further provided for emitting a light of a predetermined wavelength for each of said plurality of openings.

10. An image display apparatus as claimed in claim 9, wherein a micro array lens is further provided for focusing the light from said light source for each of said openings, so that light of a predetermined wavelength is introduced to a corresponding opening.

11. An image display apparatus comprising:
    a display device for displaying a plurality of pixels, each having a luminance distribution; and
    an optical element for diffusing each of the pixels displayed by said display device so that, on an image forming plane to be viewed by a viewer, each of said pixels has a plurality of peaks with almost identical luminance distribution and a total of half width values of said plurality of peaks is almost identical to a distance between adjacent pixels of an identical color.

12. An image display apparatus as claimed in claim 11, wherein
    said display device has a plurality of openings corresponding to said pixels and displays each of said pixels by light transmitting through said openings; and
    each of said openings has a shape which is different from a shape of each of said pixels displayed by said display device.

13. An image display apparatus as claimed in claim 12, wherein a light source is further provided for emitting a light of a predetermined wavelength for each of said plurality of openings.

14. An image display apparatus as claimed in claim 12, wherein a micro array lens is further provided for focusing the light from said light source for each of said openings, so that light of a predetermined wavelength is introduced to a corresponding opening.

* * * * *